United States Patent [19]
Tiemann et al.

[11] Patent Number: 6,101,894
[45] Date of Patent: *Aug. 15, 2000

[54] SAFETY DEVICE FOR SUPPORTING A PEDAL IN A MOTOR VEHICLE

[75] Inventors: Burkhard Tiemann, Bochum; Christoph Meese, Cologne, both of Germany

[73] Assignee: ED. Scharwächter GmbH, Remscheid, Germany

[*] Notice: This patent is subject to a terminal disclaimer.

[21] Appl. No.: 09/128,357

[22] Filed: Aug. 3, 1998

[30] Foreign Application Priority Data

Aug. 3, 1997 [DE] Germany ............................ 197 33 512

[51] Int. Cl.⁷ ................ G05G 1/14; B60K 28/14
[52] U.S. Cl. ................................. 74/512; 74/560
[58] Field of Search ............................ 74/512, 560, 513; 180/274, 275

[56] References Cited

U.S. PATENT DOCUMENTS 5,848,558 12/1998 Isono et al. ................................ 74/512

FOREIGN PATENT DOCUMENTS

| | | | |
|---|---|---|---|
| 3533420 | 3/1987 | Germany | 74/512 |
| 4340633 | 6/1994 | Germany | 74/512 |
| 4409235 | 10/1994 | Germany | 74/512 |
| 4409324 | 10/1994 | Germany . | |

*Primary Examiner*—Mary Ann Battista
*Attorney, Agent, or Firm*—Brown & Wood, LLP

[57] ABSTRACT

A safety device for supporting a pedal in a motor vehicle and which includes a bearing support for supporting a pedal shaft of the pedal and arranged between a wall portion of a front wall of the motor vehicle, which is noticeably deformed inward into a passenger compartment during a frontal collision of the motor vehicle, and a cross-member which is located in the passenger compartment in a spaced relationship with respect to the front wall, is secured to a motor vehicle body, and does not substantially change a spacial position thereof during the frontal collision, the bearing support including radially open bearing slot in which the pedal shaft is supported, and an element for lifting the pedal shaft of the bearing slot of the bearing support in case of the frontal collision.

7 Claims, 2 Drawing Sheets

SAFETY DEVICE FOR SUPPORTING A PEDAL IN A MOTOR VEHICLE

BACKGROUND OF THE INVENTION

1. Field of the Invention

The present invention relates to a safety device for supporting a pedal, in particular a braking pedal, in a motor vehicle and including a bearing support for supporting a pedal shaft of the pedal and arranged between a wall portion of a front wall of the motor vehicle, which is noticeably deformed inward into a passenger compartment during a frontal collision of the motor vehicle, and a cross-member which is located in the passenger compartment in a spaced relationship with respect to the front wall, is secured to a motor vehicle body, and does not substantially change its spacial position during the frontal collision. The pedal shaft is retained in an abutment in the bearing support which, under normal operational conditions of the motor vehicle, absorbs the reaction forces generated upon actuation of the pedal necessitated by the normal operational conditions of the motor vehicle. During a frontal collision of the motor vehicle, the pedal shaft is released by a release mechanism supported on the cross-member.

2. Description of the Prior Art

During a collision of a motor vehicle, there exists a danger that as a result of deformation of the front of the vehicle, the parts arranged in the region of the front wall of the vehicle such as, e.g., the steering gear or braking elements, in particular, the brake power booster will be displaced inward in the direction toward the passenger compartment, in particular, toward the driver.

Therefore, different means for removal of the operational devices which are arranged in the region of the driver's seat, in case of an accident and, in particular, in case of a frontal collision, were proposed. Thus, German publication DE-OS 33 37 232 discloses a device which in case of a relative movement, caused by an accident, of constructional elements, which are arranged in a motor space, e.g., of the vehicle motor, of the steering column, should pull them forward, away from the driver, which results in an increase in free space in the regions of driver's breast and head.

As a result of a deformation of a front of a vehicle caused by a frontal collision, operational devices arranged in the region of the front wall of the vehicle are displaced inward, i.e., toward the vehicle driver. Some of these devices, in particular, the pedal units, which are located in the foot area of the driver's seat, can be displaced so far back that they can cause an injury to the driver. Thus, the impact forces can result in a transmission of a pivotal torque, which is generated by impact forces, to a pedal, in particular to a braking pedal by a brake rod which is connected with the pedal lever and is spaced from the pedal shaft. This pivotal torque causes pivoting of the pedal in a direction opposite to its actuation direction which can result in a serious injury of the driver whose foot may be on the pedal.

German Patent No. 2,841,988 discloses a pedal unit provided with a pedal support which is connected, in its upper region, to a cross-member of a vehicle, which connection is released by a relative movement of the braking unit resulting from a collision. The lower region of the pedal support remains permanently connected to another part of the vehicle with appropriate connecting means during the collision. As a result, when deformation of the front of the vehicle, which is caused by a collision, occurs, the pedal support moves, together with the pedal, forward and downward, increasing free space for the driver's feet.

German Publication DE-OS 39 04 616 discloses an arrangement for supporting at least one pedal and including a bearing support which is secured to the front wall and which cooperates with an ejection or a deflection device secured to a cross-member, located in a passenger compartment in a spaced relationship to the bearing support. The deflection or ejection device is so formed that in case of a frontal collision, it imparts to the bearing support/pedal unit, which tends to move inward, a pivotal movement which results in the movement of the pedal forward toward the front wall. While the known safety devices provide for a certain safety in the region of the foot area in front of the drier's seat, the total safety cannot be achieved and some danger of injury still remains because the pedal still remains in the foot area of the driver.

Accordingly, an object of the present invention is to provide such a safety device for supporting a pedal, in particular, a braking pedal, which in case of a dangerous accident, on one hand, insures increase of the foot area and, on the other hand, excludes emerging of loose parts.

SUMMARY OF THE INVENTION

This and other objects of the present invention, which will become apparent hereinafter, are achieved by providing in the bearing support radially open bearing means in which the pedal shaft is supported and which absorbs reaction forces generated during actuation of the pedal which is necessitated by operational conditions of the vehicle, and by further providing means for lifting the pedal shaft of the bearing support in case of a frontal collision.

The solution according to the present invention distinguishes from the known solution in that instead of moving the pedal forward, the pedal is moved upward from the foot area of the driver. Thereby, on one hand, an increase of the foot area is achieved and, on the other hand, the danger of injury from loose parts is excluded.

According to a preferred embodiment of the present invention, the bearing support is formed as a sheet metal structural member secured to the cross-member, and the lifting means is likewise formed as a sheet metal structural member which engages the pedal shaft from beneath and which is secured to the wall portion of the front wall which is deformed during the frontal collision. Though the attachment of the bearing support and thereby of the pedal shaft to the cross-member, which is secured to the vehicle body, provides certain advantages, the present invention also contemplates securing of the bearing support to the front wall and securing of the lifting element on the cross-member secured to the vehicle body. The important thing consists in that in case of a frontal collision, the bearing support and the lifting element are so positioned relative to each other that the pedal is lifted of the bearing support.

According to a further advantageous development of the present invention, the radially open bearing means is formed as a slot having a somewhat U-shaped cross-section, and the safety device further includes a member, which overlaps the pedal shaft and closes the radially open bearing slot under normal operational conditions of the motor vehicle. Thereby, falling of the pedal shaft out of the radially open bearing slot during the normal operational conditions of the motor vehicle is prevented. The overlapping and closing member is automatically lifted of the pedal shaft by the lifting means during the frontal collision of the motor vehicle, with the pedal shaft being lifted of the radially open bearing slot. This insures lifting of the braking pedal from a foot region of the motor vehicle. Advantageously, it is further contemplated to form the overlapping and closing member as a spring clip which extends transverse to a longitudinal extent of the pedal shaft and which engages the bearing support. The clip, together with the pedal shaft, is lifted by the lifting element during the frontal collision.

For operation of the safety device according to the present invention, it is sufficient to form the lifting element as an element which engages the pedal shaft from beneath and which moves upward in the direction of the intended pedal shaft movement in case of collision. In a simplest case, the lifting element is formed as a stamped sheet metal member. However, preferably, the lifting element is formed with an upper surface which ascends upward toward the front wall.

According to a further preferred embodiment of the present invention, the bearing support is formed as a substantially U-shaped sheet metal stamping, and the radially open bearing slot is formed as a free-stamped U-shaped recess formed in each of legs of the U-shaped stamping and in which the pedal shaft is received. The lifting means is likewise formed as a U-shaped sheet metal stamping, with the U-shaped stamping being engageable between legs of the U-shaped stamping forming the bearing support.

In connection with this so-formed embodiment of the safety device according to the present invention, it is further advantageously contemplated to form the clip as a U-shaped bearing shell having at least one nose engageable, under normal operational conditions of the vehicle, in a detent opening which is provided in a leg of the U-shaped bearing support.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
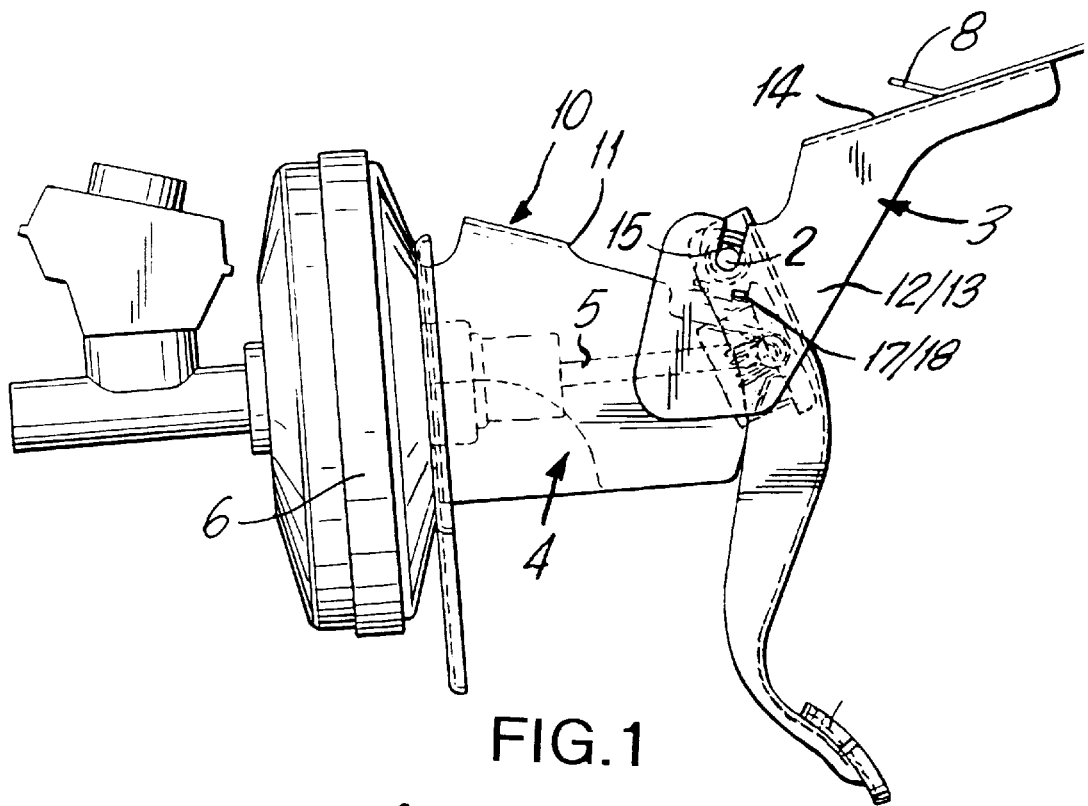
FIG. 1 shows a side view of a pedal suspension, which is located in a foot region of a motor vehicle, during a normal operation of the motor vehicle.
Figure 2:
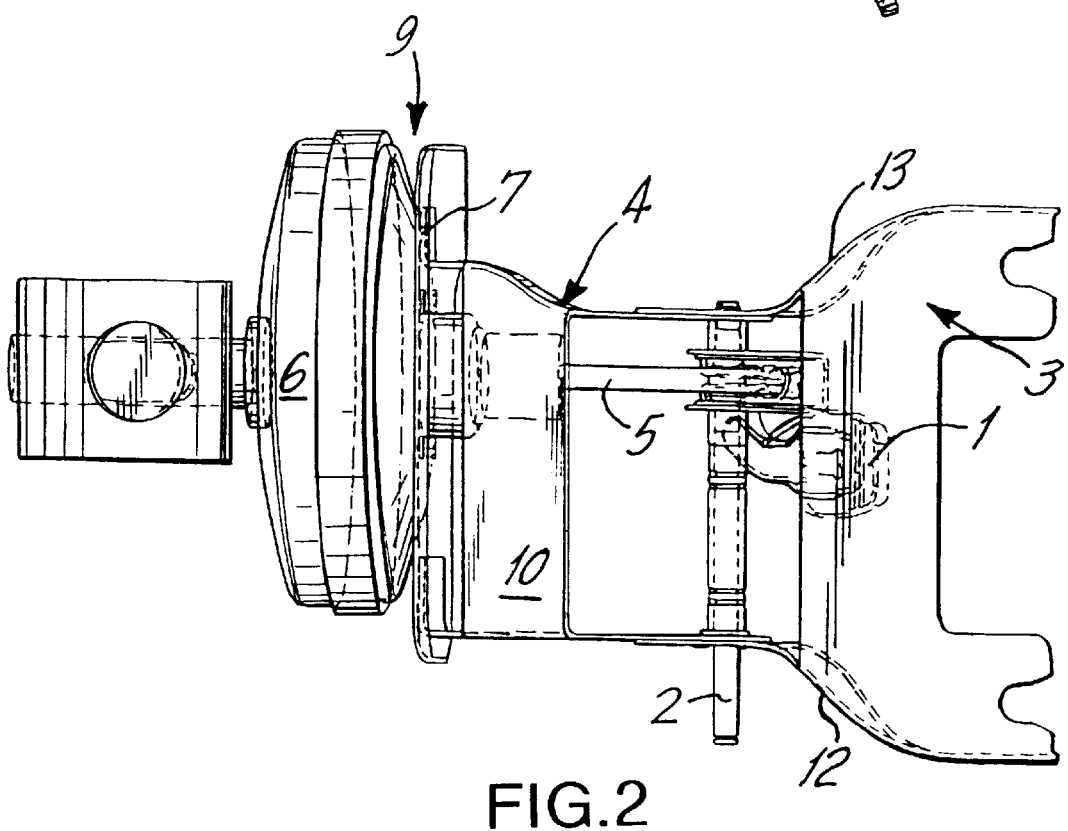
FIG. 2 shows a top view of the pedal suspension shown in FIG. 1.
Figure 3:
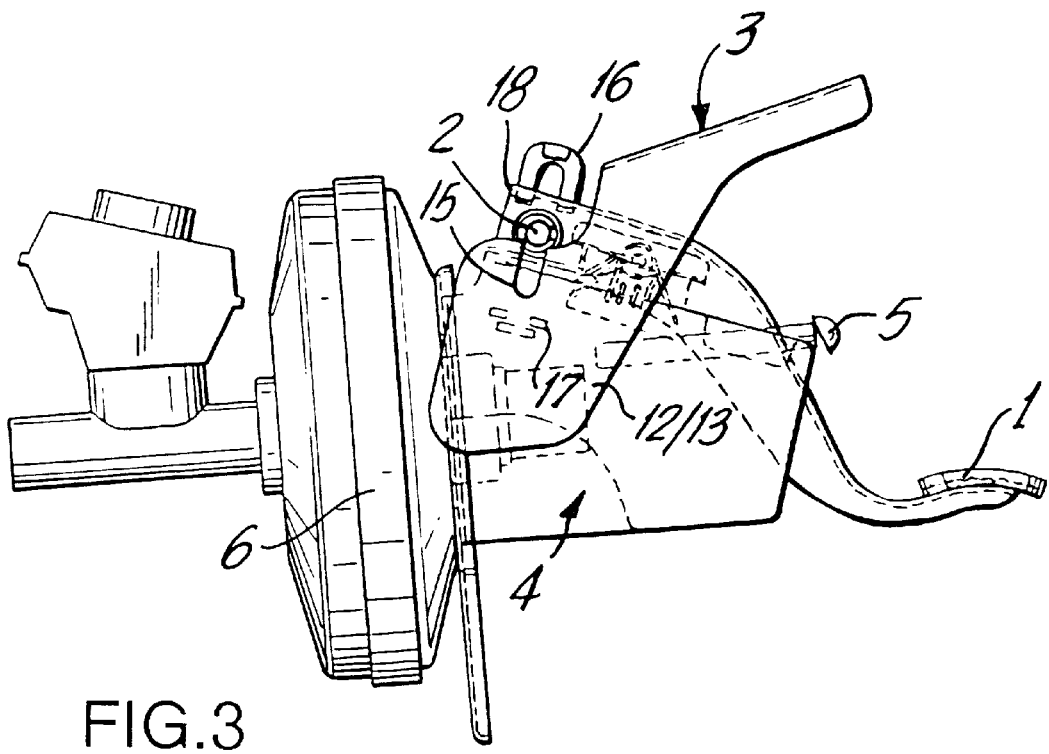
FIG. 3 shows a side view of the pedal suspension shown in FIG. 1 after a frontal collision of the vehicle.
Figure 4:
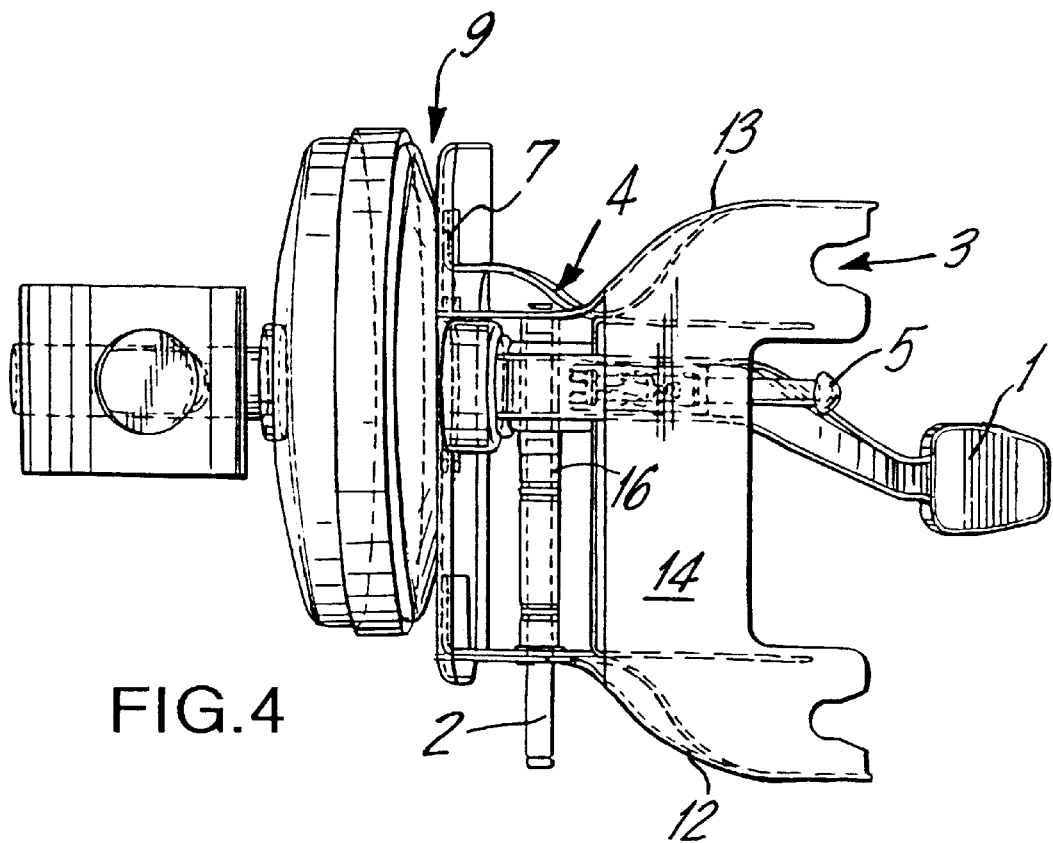
FIG. 4 shows a top view of the pedal suspension shown in FIG. 3.

The drawings show only those portions of a foot region of a motor vehicle and of a pedal suspension which are necessary for understanding of the present invention. In particular, the drawings show a braking pedal 1 which cooperates with a brake power booster 6 and to which it is connected with a push rod 5. The pedal suspension, which is shown in the drawings, essentially includes the pedal 1, a pedal shaft 2, a bearing support 3 for supporting the pedal shaft 2, and a lifting element 4 associated with the pedal shaft 2. The lifting element 4 is formed of a U-shaped sheet metal stamping which is secured with its foot portions 7 to a wall region of a front wall 9 which is located opposite a cross-member 8 fixedly secured to the vehicle body. During a frontal collision of the motor vehicle, this wall portion is noticeably deformed inward into the passenger compartment toward the cross-member 8. A portion of the U-shaped sheet metal stamping, which forms the lifting element 4 and which cooperates with the pedal shaft 2, has an inclined surface 10 which ascends upward toward the front wall 9. In the embodiment shown in the drawings, the inclined surface 10 has at least one step 11. The lifting element 4 is engaged between two legs 12 and 13 of the likewise U-shaped bearing support 3, which is secured with its base 14 to the cross-member 8, in such a manner that the-inclined surface 10 is located beneath the pedal shaft 2. The pedal shaft 2 is supported in portions of the legs 12 and 13 of the bearing support 3 which rise above its base 14. For supporting the pedal shaft 2, in each of the legs 12 and 13, there is provided a U-shaped, upward opening bearing recess 15. The bearing support 3 absorbs reaction forces which are generated during actuation of the pedal 1 which is necessitated by operational conditions of the motor vehicle. During a normal operational position which is shown in FIGS. 1 and 2, the pedal shaft 2 lies on a bottom of a respective bearing recess 15 and is retained in this position by an overlapping bearing member which in the embodiment shown in FIGS. 1 and 2, is formed as a spring clip 16. The spring clip 16 overlaps the pedal shaft 2 and is retained, in its normal position, in the legs 12 and 13 of the bearing support 3. The clip 16 has detent noses 18 which engage in detent recesses 17 formed in the legs 12, 13. During a frontal collision, the wall portion of the front wall, which carries the lifting element 4, is deformed, and the lifting element 4 moves relative to the bearing support 3, which is secured to the cross-member 4, attaining a position shown in FIGS. 3 and 4. The pedal shaft 2 is lifted by the inclined surface 10 of the lifting element 4 off the upwardly open bearing recess 15, with the pedal 1 being lifted from the foot region of the motor vehicle upward, as a result. In its lifted position, the pedal 1 lies on the inclined surface 10 of the lifting element 4. Thus, during a frontal collision of the motor vehicle, no separate elements of the pedal unit can emerge.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A safety device for supporting a pedal in a motor vehicle, comprising:

a bearing support for supporting a pedal shaft of the pedal and locatable between a wall portion of a front wall of the motor vehicle which is deformed inward into a passenger compartment during a frontal collision of the motor vehicle, and a cross-member which is located in the passenger compartment in a spaced relationship with respect to the front wall, is secured to a motor vehicle body, and does not substantially change a spatial position thereof during the frontal collision, the bearing support including radially open bearing means in which the pedal shaft is supported and which absorbs reaction forces generated during actuation of the pedal necessitated by operational conditions of the motor vehicle; and means for lifting the pedal shaft out of the bearing means of the bearing support in case of the frontal collision, wherein the radially open bearing means have a somewhat U-shaped cross-section, and wherein the safety device further comprises a member for overlapping the pedal shaft and for closing the radially open bearing means under normal operational conditions of the motor vehicle, thereby preventing the pedal shaft from falling out of the radially open bearing means during the normal operational conditions of the motor vehicle, the overlapping and closing member being automatically lifted out of the pedal shaft by the lifting means during the frontal collision of the motor vehicle, with the pedal shaft being lifted out of the radially open bearing means, whereby lifting of the pedal from a foot region of the motor vehicle is insured.

2. A safety device as set forth in claim 1, wherein the overlapping and closing member is formed as a spring clip which extends transverse to a longitudinal extent of the pedal shaft and which engages the bearing means, the clip, together with the pedal shaft, being lifted by the lifting means during the frontal collision.

3. A safety device as set forth in claim 2, wherein the clip is formed as a U-shaped bearing shell and has at least one nose which is engaged, under the normal operational conditions of the motor vehicle, in a detent opening formed in a leg of the U-shaped bearing means, whereby the clip is secured to the bearing support.

4. A safety device for supporting a pedal in a motor vehicle, comprising:

a bearing support for supporting a pedal shaft of the pedal and locatable between a wall portion of a front wall of the motor vehicle which is deformed inward into a passenger compartment during a frontal collision of the motor vehicle, and a cross-member which is located in the passenger compartment in a spaced relationship with respect to the front wall, is secured to a motor vehicle body, and does not substantially change a spacial position thereof during the frontal collision, the bearing support including radially open bearing means in which the pedal shaft is supported and which absorbs reaction forces generated during actuation of the pedal necessitated by operational conditions of the motor vehicle; and means for lifting the pedal shaft out of the bearing means of the bearing support in case of the frontal collision, wherein the bearing support is formed as a sheet metal structural member securable to the cross-member, and wherein the lifting means is likewise formed as a sheet metal structural member for engaging the pedal shaft from beneath and which is securable to the wall portion of the front wall which is deformed during the frontal collision.

5. A safety device as set forth in claim 4, wherein the lifting means comprises an inclined surface ascending upward toward the front wall.

6. A safety device as set forth in claim 4, wherein the sheet metal structural member forming the bearing support is formed as a substantially U-shaped sheet metal stamping, and the radially open bearing means is defined by free-stamped U-shaped recesses formed in respective legs of the U-shaped stamping for receiving the pedal shaft.

7. A safety device as set forth in claim 6, wherein both sheet metal structural members are formed each as a substantially U-shaped sheet metal stamping, and wherein the U-shaped sheet metal stamping forming the lifting means is engageable between legs of the U-shaped sheet metal stamping forming the bearing support.

* * * * *